Figure 1:
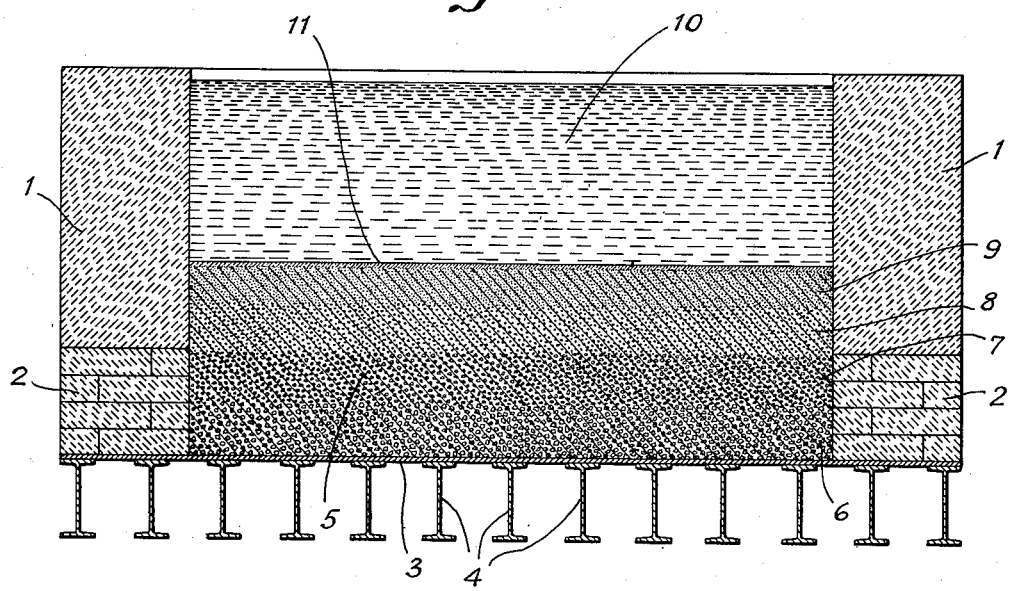

Nov. 18, 1941.    P. G. WILLETTS    2,262,826
METHOD AND STRUCTURE FOR FORMING CONTAINERS FOR MOLTEN GLASS
Filed March 2, 1936

Witness:
A. A. Horn

Inventor:
Paul G. Willetts
by Brown + Parham
Attorneys.

Patented Nov. 18, 1941

2,262,826

UNITED STATES PATENT OFFICE 2,262,826

METHOD AND STRUCTURE FOR FORMING CONTAINERS FOR MOLTEN GLASS

Paul G. Willetts, Bolton Center, Conn., assignor to Hartford-Empire Company, Hartford, Conn., a corporation of Delaware Application March 2, 1936, Serial No. 66,662

15 Claims. (Cl. 49—54)

This application relates to a method and a structure for forming containers for molten glass, more particularly for forming the bottom and/or side portions of glass-containing furnaces, forehearths and the like.

A primary object of the present invention is to provide a method and a structure by which containers for molten glass, particularly glass melting tanks or furnaces, may be insulated as to a portion at least of the glass contacting walls thereof in order to conserve a maximum amount of the heat heretofore lost through such walls, while at the same time providing a structure which will have a relatively long life as compared with prior structures heretofore used for this purpose.

A further object of the invention is to provide a relatively cheap structure for containers for molten glass which may be easily and quickly installed.

A still further object of the present invention is to provide a structure for the bottom and/or side walls for containers for molten glass wherein the use of formed refractory blocks for contact with the molten glass is obviated.

In the past it has been the general practice to form the bottoms and sides of containers for molten glass, such as glass-making furnaces, of formed refractory blocks, which have a relatively high conductivity for the transfer of heat therethrough. This heat is usually lost.

In general, these furnaces have been uninsulated and hence have been relatively inefficient due to the great loss of heat, especially through the glass-contacting walls. Efforts have been made to conserve some of this heat by applying insulation back of the formed refractory blocks, but such efforts, when successful, require special provisions which are costly and still involve the wasting of a material amount of heat.

In prior attempts to insulate glass melting furnaces by providing a continuous layer of insulating material below the bottom wall, difficulties have been encountered arising from the hot glass penetrating between the glass-contacting inner blocks and getting behind these blocks and in contact with the insulation.

In instances where the glass-contacting blocks were lighter than the glass, they have often been floated out of place. Even where the blocks were heavier than the glass, the result of this penetration of glass therebetween was the formation of cords and other imperfections in the glass as well as the damaging of the insulation structurally and in its insulating ability.

Also where the molten glass was in contact with more than the desired glass-contact surface of the blocks, the rate of erosion or solution of the blocks by the glass was increased to an undesired extent, and their useful life correspondingly shortened.

A further difficulty has heretofore been present in insulated furnaces, namely, that the insulation, especially around the blocks forming the hotter portion of glass melting tanks, caused those blocks to be heated to such an extent that the wear thereon was excessive and the life of the installation correspondingly short. Inasmuch as blocks of this character are expensive, and the rebuilding of a tank is a considerable undertaking, it has frequently proven to be prohibitive from an economic point of view to insulate such structures, as the wear on the blocks and the frequent rebuilding of the structure has outweighed the cost of the heat lost by leaving the structure substantially uninsulated. The cost of this heat is, however, a very considerable part of the total cost of all the heat supplied to the structure, often forty per cent or more.

Glass tank furnaces have been successfully insulated by the application of what is known as "panel insulation" in accordance with the invention of my prior Patent No. 1,996,266, granted April 2, 1935, in which the faults arising from the penetration of the glass between the blocks in contact with the bath were avoided by applying insulation to the blocks only between the joints, leaving the joints themselves open to the atmosphere, so that the localized cooling at the joints caused the glass to freeze therein. While this "panel insulation" is a great improvement, it involves the loss of a material amount of heat and the construction involves a considerable expense.

In the use of the furnaces of the prior art, consisting as they did of preformed refractory blocks, there has been a great wastage of the block material. Certain of the glass-contacting portions of these furnaces have been worn away and/or dissolved by the glass at a much higher rate than other portions. When the blocks of these first portions were worn to a given extent, the entire glass-contacting portion of the furnace has usually been rebuilt of new blocks, and all the partly worn blocks have been discarded, or if they were used at all, they only displaced relatively cheap material.

A further object, therefore, is to provide bottom and/or side portions for containers for molten glass of material, a substantial part of which may be used continuously or repeatedly until it is entirely consumed.

Figure 2:
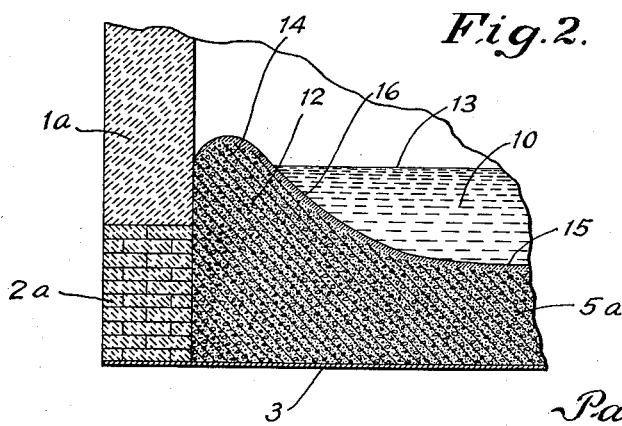

Other and more detailed objects of the present invention will become apparent from the following description and appended claims when taken in connection with the accompanying drawing, in which:

Figure 1 illustrates diagrammatically in vertical transverse section a container for molten glass including a bottom constructed in accordance with my invention; and Fig. 2 is a fragmentary view substantially in vertical section illustrating an application of my invention in forming both the bottom and sides of a container for molten glass.

In constructing containers for molten glass of the type shown in Fig. 1, the side walls may be first erected substantially in accordance with present practice, that is, by the use of blocks of refractory material, as indicated at 1, which may be supported upon suitable refractory brick work 2. As shown, the brick work 2 is in turn supported upon a metallic plate 3, carried by a plurality of I-beams 4. The plate 3 also serves as a substantially continuous support for the bottom, the construction of which will presently be described.

Upon the bottom support 3 and between the side walls, I place in position one or more superimposed layers of substantially granular refractory material 5, this material being poured and/or tamped into position and leveled off, as generally indicated in Fig. 1.

As particularly shown in this figure, there may be a plurality of layers of the refractory material 5, as indicated at 6, 7, 8 and 9 respectively, the average grain size of the material of the several layers being progressively smaller as indicated from the lowermost to the uppermost of these layers. Alternatively, I may utilize a substantially homogeneous mixture of refractory material of different grain size in such manner that the smaller grains will substantially fill the interstices between the larger ones. Such a mixture of material of different grain sizes is used in the structure shown in Fig. 2.

The grain size of the material 5, when arranged in either of the ways above disclosed, may include some material of relatively large size, for example, 4-mesh or larger, and may also include material of various smaller sizes including some even as small as 325-mesh or smaller, in effect an impalpable powder.

I contemplate that, if desired, the supporting plate 3 may be provided with holes sufficiently small that the granular refractory material placed thereabove will not pass through, once it has been placed in position. This will permit "breathing" of the mass of granular refractory thereabove, which may be desirable under certain circumstances.

Above the material 5 in the Fig. 1 form of the invention, or as an upper layer of the various superimposed layers there illustrated, I may place a relatively thin layer of the same material in substantially powder form to fill the interstices of the subjacent layer 9 of the material 5 at least adjacent to the upper surface thereof. This, however, is not essential to the practice of my invention, but may be desirable in certain instances.

In preparing a bottom for a container for molten glass formed in any of the above-mentioned ways, I preferably place above the refractory material 5 a relatively thin layer of some material having a lower vitrification temperature than that of the material 5. Then, before the normal charge of glass 10 is supplied to the container, either as molten glass or as glass-making batch, I preferably heat the interior of the container to a temperature sufficient to effect vitrification of the material of the upper surface of the bottom to form a substantially impervious vitreous layer 11 of material for contact with the molten glass 10.

The material selected for forming the impervious vitreous layer may be some glass-forming material, preferably, although not necessarily, having a higher vitrification temperature than that of the glass 10 to be contained in the structure. I have found by experiment, however, that if crushed glass of the same character as that normally to be contained in the structure, or the mixture of raw materials normally used in forming such glass, is placed in a thin layer on the top of the material 5, desirable results in producing an upper vitreous impervious layer will be obtained. In any event, I normally contemplate that the surface layer be substantially vitrified by exposing it to a temperature usually, although not necessarily, somewhat above that to which the structure will be subjected in its normal use. Under these circumstances, the glass or vitreous material placed in a thin layer upon the surface as aforesaid reacts chemically with portions of the bottom-forming material 5 to form a vitreous layer, which is impervious to the passage of molten glass 10 which is to be contained in the structure. However, even without the use of the surface-forming materials as aforesaid, certain advantageous results are obtained by exposing the upper surface of the materials to temperatures higher than those to which it is to be exposed in its normal use, just prior to supplying the molten glass 10 or material to form such glass to the container.

During the subsequent use of the structure, the impervious vitreous layer 11 will be gradually eroded or dissolved by the molten glass in the container, but the composition of the refractory bottom material is such that, as the upper surface thereof is dissolved and carried away in solution in the glass, the combined action of the heat in the structure and the glass 10 present therein, effects a continuous and progressive vitrification of the subjacent layer of the material 5, so that there will always be a vitreous layer as shown at 11 intermediate the glass 10 and the remaining granular material 5. Thus in practice, it will be unnecessary, so far as the bottom is concerned, to discontinue the operation of the furnace or other container for molten glass until the gradual solution and erosion of the upper surface of the bottom has progressed a considerable distance.

In reconstructing the container when it becomes necessary for any reason, the glass 10 is first drained out to a desired extent, then the structure is allowed to cool, after which the remaining glass and the upper vitreous layer 11 may be broken out mechanically and the remainder of the bottom material 5 used over again even without removing and replacing it, as it has not been changed in any material degree by its use. It is, therefore, only necessary to add a sufficient amount of the material 5 to that remaining as aforesaid to build the whole mass up to the desired point, which may be the same as the structure as originally built.

I have shown in Fig. 2 a modified form of my invention in which the side wall blocks 1ᵃ correspond generally to the side wall blocks 1 of Fig. 1, with the exception that these blocks are not required to come into direct contact with the molten glass and thus need not be of material resistant to the action of glass, but need only have the necessary mechanical strength and refractory value for the use made of them at the temperatures to which they will be heated during the normal operation of the structure. These blocks 1ᵃ may be built upon brick work 2ᵃ corresponding functionally to the brick work 2 of Fig. 1. The bottom support is shown at 3 and corresponds to the similarly numbered part of the Fig. 1 structure. The material 5ᵃ in Fig. 2 corresponds generally to the material 5 of Fig. 1 with the exception that this material is shown as a substantially homogeneous mixture of grains of different sizes.

The material 5ᵃ is heaped up adjacent to the side walls, as shown at 12, to form both the bottom and the lateral confining walls for the bath of molten glass 10, the heap extending a substantial distance above the normal level 13 at which the glass 10 is maintained, as shown at 14.

In constructing a device as shown in Fig. 2, it is necessary that the vitreous layer 15 on the surface of and substantially contiguous with the material 5ᵃ be formed prior to putting molten glass 10 into the container, this vitreous layer preferably extending entirely over the material 5ᵃ between the side wall blocks 1ᵃ of the structure. The vitreous layer 15 may be made as above set forth by placing over the material 5ᵃ a relatively thin layer of a glass-forming material, or some vitrifiable material having a vitrification temperature less than that of the material 5ᵃ, and then subjecting the interior of the structure to a temperature preferably greater than that to which it will be subjected in its normal operation as a glass container.

It will be noted that the angle of slope of the side wall forming portions for the glass bath 10, as shown at 16, is less than the angle of repose of the material 5ᵃ.

The granular materials 5 or 5ᵃ, of which the bottom and/or sides of the structures shown in Figs. 1 or 2 are to be formed, are preferably of the "alumina-silica" class, by which is meant materials including mixtures and/or compounds of alumina and silica, and in the present instance having a relatively large proportion of alumina, from 30 to 95 parts by weight, and the remainder substantially all silica and the small amounts of impurities necessarily found in commercially available raw materials. The material, in so far as it is used for the upper layers which may initially, or in the subsequent operation of the structures as above set forth, be called upon to form the impervious vitreous layer for contact with glass, should have a bulk specific gravity for each grain not less than the specific gravity of the glass to be contained within the structure, considered at the temperature at which that molten glass 10 is to be maintained, so that there will be no tendency for the grains of the material to float upward through the molten glass, should the glass penetrate to—surround such grains. In practice, the material 5 or 5ᵃ should have a bulk specific gravity for each grain of at least 2.2, and possibly higher, depending upon the specific gravity of the particular glass to be used in a particular container.

Preferably, however, I employ a material of the alumina-silica class as aforesaid having from 70 to 75% alumina content by weight. This material is prepared by selecting clays or other raw materials in desired proportions, mixing such materials and calcining the mixture at selected temperatures, this calcining temperature being usually substantially above any temperatures to which the material will be later subjected in its ordinary use as aforesaid. After the material has been calcined, it is mechanically broken down to the desired grain sizes or mixtures thereof and used as such in forming the bottom and/or sides of containers for molten glass, as shown in Figs. 1 or 2. Also, in some instances, structures may be made employing both methods of construction in different parts thereof, or some equivalent method or methods.

As an example, I take

|  | Parts by weight |
|---|---|
| Georgia white bauxite | 58 |
| Monohydrate of alumina | 25 |
| Clay known as G-1, as furnished by the Savannah Clay Company of Savannah, Georgia | 11 |
| Commercial feldspar | 6 | as starting ingredients. These materials are ground to impalpable fineness in a ball mill. They are assembled into a plastic body by the usual well-known commercial pugging and extruding method into a "dobbie" shape for proper handling and drying. When dry, these "dobbies" are placed in a kiln wherein they are calcined at a temperature in excess of 2800° F. They are then permitted to cool and are broken down into grains of the size of ¼" mesh and smaller. This material, as thus prepared, has a chemical analysis approximating:

| | |
|---|---|
| $SiO_2$ | 21 |
| $Al_2O_3$ | 74 |
| $Fe_2O_3$ | 0.79 |
| $TiO_2$ | 2.85 |
| CaO | .27 |
| MgO | Trace |
| $Na_2O$ | 0.97 |

The grains have a bulk specific gravity in excess of 2.7. This material, prepared as aforesaid, is employed in granular form in building the bottom and/or sides of the container for molten glass as herein specifically taught.

While in the practical construction of a container for molten glass embodying my invention, I prefer to use a material in granular form including some fines and with possibly a thin layer of fines on or adjacent to the upper surface, it is highly desirable that some of the granular material, especially in the lower layers, be of substantial size, such for example, as material which would require a 16 mesh screen or larger through which to pass. There is no specific limit in the way of proportion of fines which would render the granular material non-usable in practice, but the relative usefulness decreases with increasing proportion of fines over a certain amount. I have found, for example, that a desirable ratio of different size grains is as follows:

40 parts through 4 mesh on 16
27 parts through 16 mesh on 30
33 parts through 30 to impalpable powder I also contemplate that some materials other than those strictly within the "alumina-silica" class, as above defined, for example magnesite, may be usable in forming bottoms and/or sides for containers for molten glass as above set forth. I do not wish to be limited, therefore, to any specific chemical composition for the materials 5 or 5a, but contemplate that any loose, granular refractory material, which will be satisfactory in use, may be employed according to my present teaching.

After a container for molten glass has been formed according to the method above outlined and of material such as above set forth and is put into use, it will be effective to prevent the loss of all but a very small amount of heat. For example, I have found with a bottom thickness of granular refractory material of substantially 15½" and with glass within the container at substantially 2650° F., there was obtained an outside temperature for the underside of the metallic plate corresponding to the plate 3 of 190° F., which is very much lower than any temperatures now obtainable in comparable structures constructed according to the teachings of the prior art and with corresponding internal glass temperatures.

In constructions made according to my present invention, it is essential that the upper layer of the materials 5 or 5a be of such character that as the surface wears or is dissolved away, the material may react continuously and progressively to form an impervious vitreous layer as aforesaid, and thus maintain the integrity of this layer and hence of the bottom and/or sides of the container for molten glass. Any subjacent layer or layers and the support therefor may be of any suitable material having the functions of providing a support for the aforesaid upper layer, which may react with the glass as stated, and preferably also of providing heat insulation to reduce the loss of heat through and from that upper layer.

Thus, such subjacent layers, as the layers 6 and 7 of Fig. 1, may be materially different in chemical and/or physical characteristics from that of the upper layer or layers. For example, the material of these subjacent layers may have a bulk grain specific gravity less than that of the molten glass. Also, such lower layer or layers may be of material which, while having good insulating and structural supporting characteristics, may not be of such character that it could chemically combine with the molten glass or other vitreous material to form an impervious vitreous layer as shown at 11 in Fig. 1 and at 15 in Fig. 2. Also, if desired, a feasible and useful construction could be made using formed blocks of insulating bricks as a subjacent layer, for example, in place of the layers 6 and 7 in Fig. 1, while using a material in accordance with the present invention for the upper or glass-contacting layer or layers. All such variations are to be considered within the purview of the present invention and to be covered by any claims which do not specifically exclude such an interpretation.

Among the advantages of the material 5 or 5a disclosed herein is that it is a heat insulating material, at least as to those portions not directly and initially in contact with the molten glass. This material, when not initially in contact with the glass, is protected by the upper impervious vitreous layer, as shown at 11 in Fig. 1 and at 15 in Fig. 2. However, if by reason of erosion or from any other cause, the molten glass penetrates through the protective layer, it will come into contact with this material heretofore used only for its heat insulating and supporting characteristics, and will react chemically therewith to form a vitreous impervious layer preventing further penetration of the glass through or laterally of the wall. This granular material of my present invention acts as aforesaid, irrespective of the characteristics of the initial glass-contacting layer between it and the molten glass in the container. The virtues of this granular material may be present in walls in which the initial glass-contact layer is made of formed refractories.

The cost of the material 5 or 5a and of the installation of a bottom and/or sides for a container for molten glass, as above set forth, is relatively small in comparison with the cost of construction of present commercial glass-making tanks composed of formed refractories.

Also, it will be evident that the time consumed in constructing such a bottom and/or sides for a container for molten glass is likewise materially less than that required in building a bottom and sides of a tank according to the prior art and present commercial practices, to say nothing of the relatively low cost of replacement or rebuilding a structure made in accordance with the present invention as compared with the cost of rebuilding a modern commercial tank for molten glass.

Various modifications both of the method and of the structure herein specifically taught will suggest themselves from the present teaching to those skilled in the art. Therefore, I do not wish to be limited except by the scope of the appended claims, which are to be construed as broadly as the state of the prior art permits.

I claim as my invention:

1. The method of forming a container for molten glass, comprising the steps of erecting side walls for the container and a support for the bottom, placing upon the bottom support and between the side walls a layer of substantially granular refractory material of such character that it will react with glass to form a vitreous layer impervious to the passage therethrough of the molten glass within the container, and thereafter forming adjacent to the surface layer only of said granular refractory material a vitreous impervious layer by reacting the surface layer portion of the granular material with glass while leaving the subjacent layers of the granular refractory material in substantially its original granular state, whereby the vitreous layer so formed prevents passage of molten glass to the subjacent layers of said material while the subjacent layers act as a heat insulation to retard the loss of heat through the bottom of the container.

2. The method according to claim 1, wherein subsequent to the placing of the granular material to form the bottom for the container and prior to the formation of the vitreous layer thereon, there is spread over the granular material a material having a lower vitrifying temperature than that of said granular material to form with the surface portion of said granular material the vitreous impervious layer as aforesaid.

3. A bottom for a container for molten glass, comprising a support, and a layer thereabove composed of substantially granular refractory material of a type which will react with molten glass in contact therewith to form a vitreous layer impervious to the passage therethrough of the molten glass in the container.

4. A bottom for a container for molten glass, comprising a support, a relatively thick layer thereabove of loose, granular refractory material, and a relatively thin impervious vitreous layer of refractory material supported on and substantially contiguous with said layer of loose refractory material, said loose granular material being of such character that it will react with molten glass when in contact therewith to form a vitreous layer impervious to the passage therethrough of the molten glass within the container.

5. A bottom for a container for molten glass, comprising an upper layer of substantially granular refractory material having a bulk specific gravity for each grain greater than that of the glass to be contained in the container, said granular refractory material being of such character that it will react with molten glass in contact therewith to form a vitreous layer impervious to the passage therethrough of the molten glass in the container.

6. A bottom for a container for molten glass, comprising a layer of substantially granular refractory material of the alumina-silica class, containing from 30 to 95 per cent. by weight of alumina, said granular refractory material being of such character that it will react with molten glass in contact therewith to form a vitreous layer impervious to the passage therethrough of the molten glass in the container.

7. A bottom for a container for molten glass, comprising a layer of substantially granular refractory material of the alumina-silica class containing from 70 to 75 per cent. by weight of alumina, said granular refractory material being of such character that it will react with molten glass in contact therewith to form a vitreous layer impervious to the passage therethrough of the molten glass in the container.

8. A bottom for a container for molten glass, comprising a layer of fired and substantially granular refractory material of the alumina-silica class, said granular refractory material being of such character that it will react with molten glass in contact therewith to form a vitreous layer impervious to the passage therethrough of the molten glass in the container.

9. A bottom for a container for molten glass, comprising a support, a plurality of layers of loose, substantially granular refractory material superimposed on said support, said material being of progressively smaller average grain size from the lowermost to the uppermost of said layers, and including substantially pulverulent refractory material as a top layer, all the refractory material of said layers being such as to react with molten glass in contact therewith to form a vitreous layer impervious to the passage therethrough of the molten glass in the container.

10. A container for molten glass, comprising side walls, a bottom support therebetween, loose, substantially granular refractory material disposed above said bottom support and between said side walls and arranged to form the entire confining walls for a bath of molten glass to be contained in the structure, said material being heaped up adjacent to the side walls to a height substantially above the normal level of the surface of the bath of molten glass to be contained in the structure and with the slopes of the heaped up portions less than the angle of repose of said granular material, and a layer of vitreous material formed upon and contiguous with said granular material, said granular refractory material being of such character that it will react with molten glass in contact therewith to form a vitreous layer impervious to the passage therethrough of the molten glass in the container.

11. A bottom for a container for molten glass, comprising a support, a relatively thick layer of substantially granular refractory material thereabove, the upper strata at least of said layer of granular material being of such character that it will react with molten glass in contact therewith to form a vitreous layer impervious to the passage therethrough of the molten glass in the container, and a relatively thin impervious layer of vitreous material above and contiguous with said layer of granular material, said bottom being formed without the use of any formed refractory blocks.

12. A wall for a container for molten glass, comprising at least in part a heat insulating material in granular form and of such characteristics that it will react in the presence of heat with the molten glass which may come in contact therewith to form an impervious vitreous layer.

13. A bottom for a container for molten glass, comprising a support, a layer thereabove composed of substantially granular refractory material of a type which will react with molten glass which may come into contact therewith to form a vitreous layer impervious to the passage therethrough of the molten glass in the container, and a vitreous glass-impervious layer of refractory material above and substantially contiguous with the first named layer of material and formed by the reaction of said material with molten glass.

14. A bottom for a container for molten glass, comprising a support, and a layer thereabove composed of substantially granular refractory material of a type which will react with molten glass in contact therewith to form a vitreous layer impervious to the passage therethrough of the molten glass in the container, but of a type which will not sinter at the normal temperature of the glass in the container so that said granular material out of contact with the glass will remain granular to provide heat insulation for the bottom.

15. A bottom for a container for molten glass, comprising a support, and a layer thereabove composed of substantially granular refractory material of a type which will react with molten glass in contact therewith to form a vitreous layer impervious to the passage therethrough of the molten glass in the container, said layer being of such thickness that in normal use a substantial portion of granular material which is out of contact with the glass will remain unsintered and provide heat insulation for the bottom of the container.

PAUL G. WILLETTS.